United States Patent
Yoshida (10) Patent No.: US 7,366,963 B2
(45) Date of Patent: Apr. 29, 2008

(54) DATA RECORDING/REPRODUCTION DEVICE, DATA RECORDING/REPRODUCTION METHOD, AND DIGITAL CAMERA

(75) Inventor: Chisato Yoshida, Saitama (JP)

(73) Assignee: Sony Corporation, Tokyo (JP)

( * ) Notice: Subject to any disclaimer, the term of this patent is extended or adjusted under 35 U.S.C. 154(b) by 547 days.

(21) Appl. No.: 10/518,061

(22) PCT Filed: Jun. 19, 2003

(86) PCT No.: PCT/JP03/07825

§ 371 (c)(1),
(2), (4) Date: Dec. 16, 2004

(87) PCT Pub. No.: WO04/001755

PCT Pub. Date: Dec. 31, 2003

(65) Prior Publication Data

US 2005/0232103 A1    Oct. 20, 2005

(30) Foreign Application Priority Data

Jun. 19, 2002    (JP)    ............................. 2002-179048

(51) Int. Cl.
    *G11B 20/18*    (2006.01)
(52) U.S. Cl. ................. 714/705; 369/53.16; 369/53.25
(58) Field of Classification Search ................ 714/704; 369/53.16, 53.35
    See application file for complete search history.

(56) References Cited

U.S. PATENT DOCUMENTS 6,141,306 A * 10/2000 Andoh ..................... 369/53.35
6,643,233 B1 * 11/2003 Yen et al. ................. 369/47.15
7,016,279 B2 * 3/2006 Sako et al. ............... 369/47.54
7,099,255 B2 * 8/2006 Kato et al. ............... 369/53.35

FOREIGN PATENT DOCUMENTS

| JP | 9-102173 | 4/1997 |
|----|----------|--------|
| JP | 11-273265 | 10/1999 |
| JP | 2000-278634 | 10/2000 |
| JP | 2002-157735 | 5/2002 |

* cited by examiner

*Primary Examiner*—Stephen M. Baker
(74) *Attorney, Agent, or Firm*—Frommer Lawrence & Haug LLP; William S. Frommer (57) ABSTRACT

The present invention is directed to a data recording method of notifying degree of deterioration of recording medium thus to perform stable recording operation. Even in the case where uncorrectable address read error does not exist, deterioration information is displayed in accordance with generated and stored deterioration information. Whether or not address read error of ATIP is detected over successive two frames or more, or whether or not four errors or more are detected on the average at 75 frames is discriminated. In the case where error detecting state is adapted to affirmative discrimination condition, warning is displayed. In the case where 200 errors or more detected from deterioration information generated in processing with respect to random missing with respect to written data exist on the average with respect to successive 750 frames, or in the case where one error or more detected in processing with respect to random missing exist, disc deterioration warning display is similarly performed.

13 Claims, 4 Drawing Sheets

EXAMPLE 1
    WRITE ADDRESS DETERIORATION

READ ADDRESS DETERIORATION

READ DATA DETERIORATION

EXAMPLE 2
    ADDRESS DETERIORATION

DATA DETERIORATION

EXAMPLE 3
    ADDRESS DETERIORATION  ←— CHANGE INTO GREEN→YELLOW→RED     DATA DETERIORATION  ←— CHANGE INTO GREEN→YELLOW→RED EXAMPLE 4
    DISC DETERIORATION EXAMPLE 5
    DISC DETERIORATION  ←— CHANGE INTO GREEN→YELLOW→RED

FIG.5

DATA RECORDING/REPRODUCTION DEVICE, DATA RECORDING/REPRODUCTION METHOD, AND DIGITAL CAMERA

TECHNICAL FIELD

The present invention relates to a data recording/reproducing device and a data recording/reproducing method, and relates to a digital camera using such a data recording/reproducing device, and more particularly relates to a data recording/reproducing device and a data recording/reproducing method which are adapted for displaying deterioration information of recording medium, and relates to a digital camera using such a data recording/reproducing device.

This Application claims priority of Japanese Patent Application No. 2002-179048, filed on Jun. 19, 2002, the entirety of which is incorporated by reference herein.

BACKGROUND ART

Disc-shaped recording media (hereinafter refereed to as optical discs) like CD (Compact Disc) in which optical reading system using light beams is applied have large memory capacity and are random accessible. Since optical reading system using light beams is not required to allow the read head to come into contact with the optical disc, it has the merit that there is no possibility that risk such as head crush, etc., and/or abrasion and/or damage of the recording medium and the head resulting from reading operation may be caused to take place as compared to the contact type recording medium like the magnetic tape.

Since the disc surface of the optical disc is covered by protective film, the optical disc may be rarely damaged by contact of foreign matter, and may also experience, to a little degree, risk such that data is accidentally lost. Optical discs having many merits as stated above are recording media which are not only useful when used as data memory means for information processing unit such as computer, etc., but also are also in excellent data production and/or data preservation.

Hitherto, there are provided recording/reproducing device using recordable optical disc such as CD-R (Compact Disc-Recordable) and CD-RW (Compact Disc-Rewritable). Among such recordable optical discs, there are also some recordable optical discs which are adapted for easily performing write operation complying with the standard format used in the so-called compact disc such as CD-ROM, CD-ROM/XA, CD-I, CD-DA. Disc drive units using such writable optical disc have been mounted into various electronic equipments in place of conventional drive units complying with magnetic tape or magnetic disc, etc.

For example, in digital cameras using CD-R/RW as recording medium, compressed or non-compressed image data are write-once recorded onto medium every photographic operation in conformity with the UDF (Universal Disc Format) standard. Particularly, in the CD-RW, since even if recordable area is lost, recording data is erased so that the CD-RW can be repeatedly used, it is necessary to take deterioration of recording medium into consideration in recording of data.

With respect to repetitive use of the CD-RW, in the specification book (Orange Book part III), it is required to ensure reliability with respect to 1000 times of repetitive recording operations or more. However, in practice, it is said that about the numbers of times of recording and erasing operations are limited to about 300 in dependency upon recording apparatus and/or recording condition, etc. in order that optimum recording state can be maintained. In the case of the digital camera, differently from recording apparatus installed (provided) within a room in use, since recording operation is executed while freely being moved under more rigorous or severe environment, repetition life of the recording medium would be further lowered.

In the optical recording system, since occurrence of error at the time of write operation is inevitable in principle, plural steps for restoring (recovering) error produced are prepared. Even in such digital cameras, verify/confirm processing of recording data is performed every time of photographic operation and recording operation to execute error detection and correction by CIRC, etc. with respect to recording data, whereby when error which cannot be restored (recovered) is detected, rerecording operation is performed, or the like to ensure reliability with respect to data recording.

There is provided a function such that in the case where even if rerecording is executed, error is detected for a second time, display to the effect that recording cannot be normally conducted is performed to hasten exchange of recording medium, etc.

In the above-described digital cameras, in recording such image data after image pick-up operation, error detection can be executed by error detecting operation, whereas even if "recording error" is alarmed (warned) at the stage of recording thereof, it is difficult for user to prepare new medium. If image data cannot be recorded by error warning, not only there would result obstacle to use of the digital camera, but also precious image data picked-up immediately therebefore might be lost.

DISCLOSURE OF THE INVENTION

An object of the present invention is to provide a novel data recording/reproducing device and a novel data recording/reproducing method, and a digital camera using such a data recording/reproducing device which can solve problems that conventional digital cameras, and/or conventional data recording/reproducing devices which have been as described above have.

Another object of the present invention is to provide a data recording/reproducing device and a data recording/reproducing method which are adapted for detecting deterioration state of recording medium to display the detected deterioration state to thereby notify degree of deterioration of the recording medium to realize stable recording operation.

A further object of the present invention is to provide a digital camera which is adapted for detecting deterioration state of recording medium to display the detected deterioration state to thereby notify degree of deterioration of the recording medium to user to realize stable recording operation.

The data recording/reproducing device according to the present invention proposed in order to attain the above-described objects comprises: recording/reproducing means for recording and/or reproducing data; deterioration information detecting means for detecting deterioration of a disc-shaped recording medium to generate first deterioration information; display means for displaying the first deterioration information of the disc-shaped recording medium; control means for performing a control to generate second deterioration information indicating deterioration in accordance with the first deterioration information to conduct a display on the display means in accordance with the first and second deterioration information.

The data recording/reproducing device generates, as first deterioration information, error frequency of recording medium which becomes clear in the process up to error detection/correction to compare the first deterioration information thus generated with a predetermined threshold value to generate second deterioration information for evaluating degree of deterioration to display, as occasion demands, the first and second deterioration information, or the first deterioration information.

The data recording/reproducing method according to the present invention includes: a deterioration detection step of detecting, in recording and/or reproducing data, deterioration of a disc-shaped recording medium to generate first deterioration information; and a control step of performing a control to generate second deterioration information indicating deterioration in accordance with the first deterioration information to display, on display means, as occasion demands, the first and second deterioration information, or one of these deterioration information.

In the data recording/reproducing method, error frequency of the recording medium which becomes clear in the process up to error detection/correction is generated as first deterioration information to compare the first deterioration information thus generated with the predetermined threshold value to generate second deterioration information for evaluating degree of deterioration to display, as occasion demands, the first and second deterioration information, or one of these deterioration information.

The digital camera according to the present invention comprises: image pick-up means for picking up an image of an object; image processing means for processing image data which has been picked up by the image pick-up means; recording/reproducing means for recording and/or reproducing the image data with respect to a disc-shaped recording medium; deterioration information detecting means for detecting deterioration of the disc-shaped recording medium to generate first deterioration information; display means for displaying the first deterioration information of the disc-shaped recording medium; and control means for performing a control to generate second deterioration information indicating deterioration in accordance with the first deterioration information to display, on the display means, as occasion demands, the first and second deterioration information, or the first deterioration information.

The digital camera serves to generate, as first deterioration information, error frequency of the recording medium which becomes clear in the process up to error detection/correction in recording image data to compare the first deterioration information thus generated with the predetermined threshold value to generate second deterioration information for evaluating degree of deterioration to display, as occasion demands, the first and second deterioration information, or the first deterioration information.

Still further objects of the present invention and practical merits obtained by the present invention will become more apparent from the description of embodiments which will be given below with refrence to the attached drawings.

BEST MODE FOR CARRYING OUT THE INVENTION

Explanation will now be given by taking an example in which data recording/reproducing device and data recording/reproducing method according to the present invention are applied to digital camera.

Figure 1:
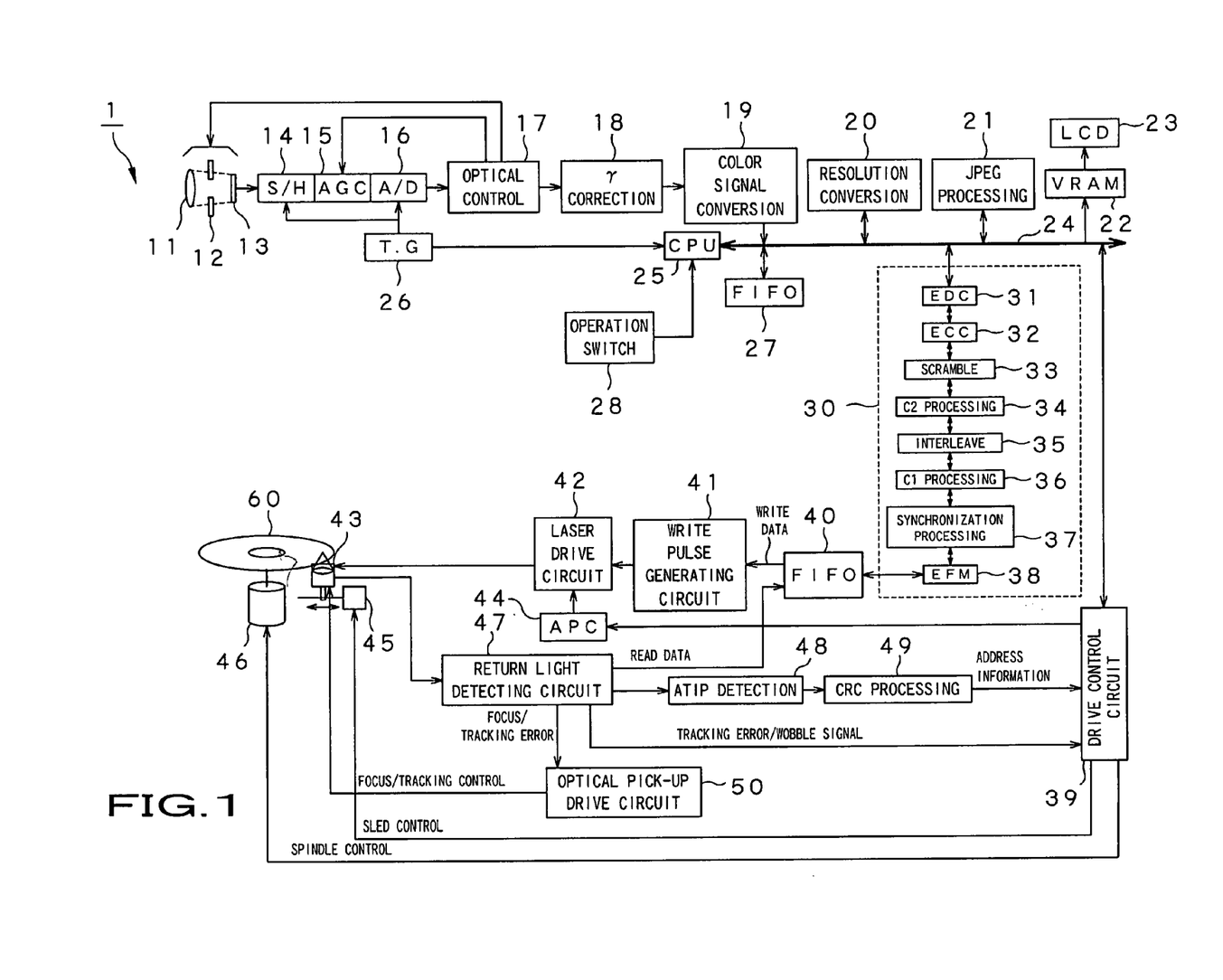
FIG. 1 is a block diagram showing digital camera according to the present invention.

The digital camera having such a configuration as shown in FIG. 1 to which the present invention has been applied is adapted to detect deterioration state of recording medium to display the detected deterioration state to thereby have ability to notify this deterioration information to user in dependency upon degree of deterioration of the recording medium.

As recording medium suitable for reproduction, there may be used any optical discs such that file management is performed on the basis of UDF (Universal Disc Format) which is in conformity with the standard prescribed in Red Book, Yellow Book and Orange Book part III, etc. which are specification book for prescribing the standard relating to format of CD, and which OSTA (Optical Storage Technology Association) has standardized. In this practical example, explanation will be given by taking an example where particularly CD-R or CD-RW is used as optical disc complying with recording of data.

At optical disc of this kind, there are provided uneven portions which are called lands and grooves. At grooves on the recording medium, time information indicating address are recorded by using Wobbles as ATIP (Absolute Time In Pregroove) information, and CRC (Cyclic Redundancy Check) code for error detection is added.

The ATIP information is information necessary for recognizing address on medium to provide access to new address along with write-in/read-out operation with respect to the recording medium. When error frequency is increased, address where desired data is recorded cannot be found so that there results servo error. Thus, such recording medium cannot be used as a recording medium.

Particularly, in the CD-RW, since the structure of groove is deteriorated by write power of laser in accordance with repetitive write operation, address error is increased.

In the present invention, error occurrence state at the time of ATIP read-out operation is quantitatively grasped by using the ATIP information.

In the data form called Mode 1 of the Yellow Book, data to be recorded onto recording medium is determined so that EDC (Error Detection Code) of four bytes and ECC (Error Correction Code) of 276 bytes are added into one recording block unit constituted with 2352 bytes. Thereafter, the data of one block is CIRC-encoded. Further, EFM (Eight to Fourteen Modulation) of the encoded data thus obtained is performed. The modulated data thus obtained are recorded onto recording medium as pits. At the time of verify processing, it is possible to grasp error occurrence state by using such EDC.

In view of the above, in the present invention, the technique for error detection/correction determined as mode 1 of the Yellow Book is applied to generate deterioration information of the recording medium in accordance with the error information.

The CIRC serves to perform error detection/correction processing with respect to burst missing (C2 processing) or random missing (C1 processing) in regard to written data. At the time of recording, subsequently to the above-described processing of mode 1, CIRC encode processing is executed. Moreover, similarly, at the time of verify processing, occurrence state of error can be grasped by using such error detecting function.

In view of the above, in the present invention, the error detection/correction processing of CIRC is used to grasp occurrence state of error.

As stated above, in the present invention, even if there results uncorrectable error at respective error detection stages, deterioration information indicating deterioration is generated (generation of first deterioration information), and detailed deterioration information are collectively displayed at the latter stage. Moreover, in the case where deterioration information is compared with a predetermined threshold value as occasion demands so that there is the possibility that deterioration of the recording medium may invite occurrence of error, warning display (generation of the second deterioration information) is performed with respect to user.

In concrete terms, as an example, deterioration judgment is performed by a threshold value which will be described below to perform warning display. First, in the above-described technique for quantitatively grasping error occurrence state at the time of ATIP read-out operation, in the case where address read error of ATIP is detected over successive two frames or more at the time of recording operation, or in the case where four address read errors or more are detected on the average at 75 frames, warning display is performed.

In the case where 200 errors or more are detected on the average at successive 750 frames in the C1 processing using CIRC, warning display is performed. In the case where at least one error is detected in the C2 processing, warning display is performed. Further, in the case where at least one error is detected in the error detection/correction technique of the mode 1 of the above-described Yellow Book, warning display is performed. These warning displays are collectively performed at the latter stage without performing them every time of detection.

As stated above, in the present invention, before uncorrectable error takes place, deterioration information is generated in accordance with the number of errors (frequency) detected at respective predetermined error correction processing, and it is possible to hasten user to exchange recording medium by warning display in accordance with the deterioration information. For this reason, unlike the conventional technique of instructing exchange of recording medium at a time point when serious error takes place, loss of recording data can be avoided in advance.

Then, digital camera 1 to which the present invention has been applied will be explained in practical sense with reference to FIG. 1. As shown in FIG. 1, the digital camera 1 includes a photographic system and a recording system, and comprises, as the photographic system, a lens 11, an iris 12, a CCD 13, a S/H circuit 14, an AGC circuit 15, an A/D circuit 16, and an optical control unit 17. In the photographic system, as a configuration for generating image data from picked-up image to implement various image processing, there are included a γ correction circuit 18, a color signal converting circuit 19, a resolution converting circuit 20, and a JPEG processing circuit 21, etc.

Before an operation in which shutter is pushed down by user, there is being conducted a processing to directly send out, to a LCD 23, at low resolution, an image which has been picked up from the photographic system.

Controls for focus, iris and electronic shutter are respectively performed from optical control unit 17 which will be described later with respect to the lens 11, the iris 12 and the CCD 13 which are shown in FIG. 1. Thus, control is performed such that image formation on the CCD 13 is placed in optimum state.

In the standby state, image data thinned from the primary number of pixels of the CCD is being outputted from the CCD 13 in order to confirm image at the LCD 23 of the succeeding stage (monitoring mode). Thus, correlative double sampling of that output is performed at the S/H circuit 14. In the case where object illumination cannot be sufficiently obtained, such output is amplified into a predetermined output level by the AGC circuit 15. The output thus amplified is converted into digital data by the A/D circuit 16. The operations of these circuit elements are controlled by control signals from a TG (Timing Generator) 26.

At the optical control unit 17, detection processing for AE (Auto Exposure), AF (AutoFocus) and AWB (Auto White Balance), etc. are performed with respect to an input image. In the AE control, control of the electronic shutter of the iris 12 and the CCD 13 is performed. In the AF control, focus control is performed with respect to the lens 11. Moreover, in the AWB processing, balance of respective components of RGB is adjusted so that color temperature of the light source becomes equal to a predetermined white color temperature. The γ correction circuit 18 executes γ correction, and the color signal converting circuit 19 performs conversion from RGB to Y color difference (YCbCr). Such signals are written into VRAM 22, and are sequentially displayed on the LCD 23.

As the operation after release operation, when a CPU 25 of the digital camera 1 detects release operation (push-down of shutter) at an operation switch 28, it serves to switch operation mode of the CCD 13 from the monitoring mode to full pixel output mode. For a time period of the full pixel output mode, image display of the LCD 23 is temporarily switched into standby picture such as blueback, etc. Except for the fact that the number of pixels of image data is different at the time of photographic operation, flows of control signals and recording data up to the color signal converting circuit 19 are the same as those of the above-described operation.

At the color signal converting circuit 19, color signal of image data to be recorded is converted from RGB to YCbCr. Thereafter, at the resolution converting circuit 20, contraction arithmetic processing of image size is performed in accordance with designated recording image size. Moreover, as occasion demands, at the JPEG processing circuit 21, JPEG compression processing is executed.

The image data to which the contraction arithmetic processing and the JPEG compression processing have been implemented is temporarily stored into a FIFO 27. In the case where "non-compression" is designated, image data is directly stored into the FIFO 27 without performing JPEG converting processing at the JPEG processing circuit 21. Moreover, in the case where, e.g., image data has TIFF form, etc., converting processing from RGB to Y color difference at the color signal converting circuit 19 is not executed, such image data is stored into the FIFO 27 in the state where it remains to be in RGB form.

The image data which have been picked up as stated above are recorded onto a disc-shaped recording medium in a manner as described below. The recording operation here is executed in parallel to photographic operation and independently thereof by relaying the FIFO 27.

Data stored in the FIFO 27 is sent to a decoding & encoding unit 30. The decoding & encoding unit 30 includes an EDC circuit 31, an ECC circuit 32, a scramble circuit 33, a C2 processing circuit 34, an interleave circuit 35, a C1 processing circuit 36, a synchronization processing circuit 37, and an EFM circuit 38, and serves to encode image data to generate recording data and to decode recording data to take out image data.

In generating recording data, here, data for error detection is added to recording data in 2 (two) k byte units in accordance with the system determined as mode 1 of the Yellow Book at the EDC circuit 31. In addition, at the ECC circuit 32, code for correction is further added.

The recording data to which correction code has been added is subsequently sorted at the scramble circuit 33, and parity for burst error detection/correction is added to the recording data thus sorted at the C2 processing circuit 34 Thereafter, interleave processing of the data thus obtained is performed by the interleave circuit 35, and parity for random error detection/correction is added to the data thus processed at the C1 processing circuit 36. In a manner as stated above, block of encode/decode processing for error correction code processing using CIRC is generated.

Data necessary as synchronization data is added to the block generated here at the synchronization processing circuit 37. The data thus obtained is converted into data corresponding to recording pits and data to which EFM (Eight to Fourteen Modulation) has been implemented. The data thus obtained is temporarily stored into a FIFO 40. By the above-mentioned steps, all encode processing with respect to recording data are completed.

The CPU 25 sets address of data write destination with respect to a drive control circuit 39 in parallel to preparation operation of the recording data, and the drive control circuit 39 starts a spindle motor 46 and a sled motor 45.

Here, the color signal converting circuit 19, the resolution converting circuit 20, the JPEG processing circuit 21, the VRAM 22, the CPU 25, the FIFO 27, the decoding & encoding unit 30, and the drive control circuit 39 are connected to each other by a bus line 24.

With respect to output signal from an optical pick-up 43, a wobble signal necessary for address detection is demodulated at a return light detecting circuit 47. The output signal thus demodulated is reconstructed into address and/or other additional information at an ATIP detection circuit 48. In this instance, error detection and error correction are performed by a CRC processing circuit 49. In the case where even if signal is detected as error, such a signal is correctable, processing is continued. However, in the case where signal is uncorrectable, address recorded as ATIP information would not be detected. For this reason, deterioration information is generated from the number of errors to display such deterioration information, or when the number of errors (frequency) becomes equal to a predetermined value, warning display is performed as occasion demands.

The drive control circuit 39 further controls the sled motor 45 and the spindle motor 46 while reading out address of spot of the optical pick-up 43 by this method to move laser spot to, e.g., position slightly this side of the target address to adjust write start timing.

When spot of the optical pick-up 43 reaches write start address, a write pulse generating circuit 41 inputs write pulse to a laser drive circuit 42 in accordance with signal from the FIFO 40. Thereafter, the EFM (Eight Fourteen Modulated) data is recorded as pits onto disc 60 by laser beams from laser diode.

In recording data onto disc 60, focus/tracking control with respect to object lens (not shown) of optical pick-up 43, sled control for moving the entirety of the optical pick-up 43 from inner circumferential direction toward outer circumferential direction along tracks in spiral form, and spindle control for controlling the number of rotations of the spindle motor 46 so that spot is traced at Constant Linear Velocity (CLV), etc. are executed at all times.

Return light detection signal from photo-detector (not shown) within the optical pick-up 43 is detected as respective signals which are necessary for servo control at a return light detection circuit 47. The focus error signal and the tracking error signal which have been detected are respectively converted into signals for performing drive control of focus drive coil of the object lens, and tracking drive coil thereof at an optical pick-up drive circuit 50. Feedback controls of these focus error signal and tracking error signal are performed so that they respectively have predetermined levels or less.

The drive control circuit 39 controls the sled motor 45 so that the entirety of the optical pick-up 43 is moved in a direction from inner circumferential position to outer circumferential position of the disc 60 while performing feedback control such that average value of tracking error signal falls within a predetermined range. Moreover, the drive control signal circuit 39 receives a wobble signal detected in the process of reading out ATIP information at the return light detecting circuit 47 to control the number of rotations of the spindle motor 46 so that average of the modulation frequency thereof becomes equal to a predetermined frequency. In this example, CLV (Constant Linear Velocity) control such that linear velocity of laser spot position becomes constant is performed. On the other hand, in the example of the case of the CAV control, control is performed such that the number of rotations of the spindle motor 46 becomes constant.

Figure 2:
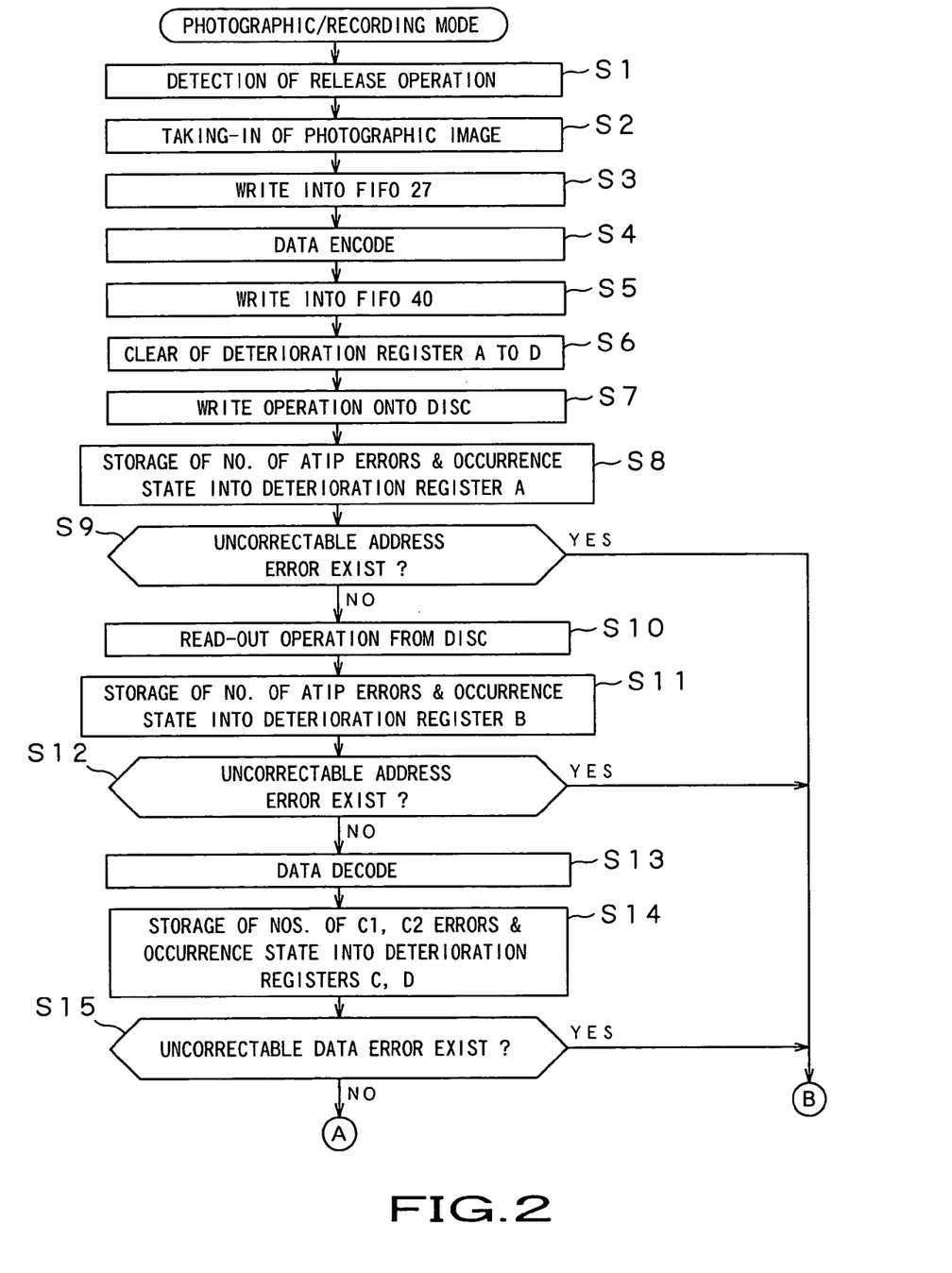
FIG. 2 is a flowchart showing error detection/correction processing procedure and medium deterioration judgment processing procedure in the digital camera according to the present invention.

The error detection/correction processing in the digital camera 1 and the deterioration discrimination processing of the recording medium according to the present invention having such configuration will be explained by using FIGS. 2 and 3.

When the CPU 15 of the digital camera 1 detects release operation at step S1, it takes thereinto a series of images in correspondence with the release operation at step S2. Moreover, at step S3, the CPU 15 serves to temporarily store the image data which has been taken in into the FIFO 27. In the case where data is stored in the FIFO 27, the CPU 15 encodes such recording data in conformity with the standard at step S4. Then, at step S5, the CPU 15 temporarily stores the encoded data thus obtained into FIFO 40.

In recording the recording data stored in the FIFO 40 onto the disc 60, a series of operations from step S6 are executed. Namely, simultaneously with the write operation, an operation for reading out addresses from wobbles of grooves formed in advance at recording medium, CD-R or CD-RW here is executed. At the step S6, prior to the error detection/correction processing and the deterioration information generation processing which are continued to subsequent stage, deterioration register which has been set at the last time is cleared.

Figure 4:
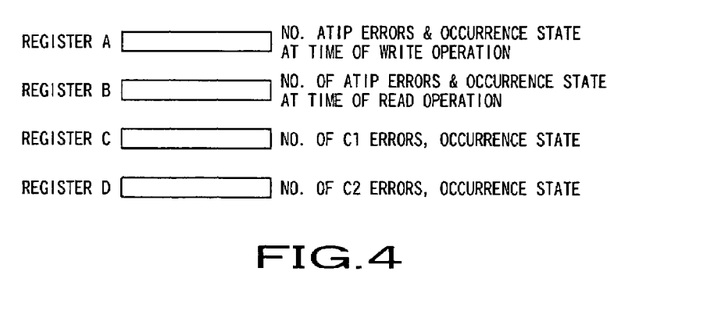
FIG. 4 is a model view for explaining the configuration of deterioration register in the digital camera according to the present invention.

An example of the configuration of the deterioration register here is shown in FIG. 4. The deterioration register A which will be described later serves to store the number of ATIP errors and occurrence state at the time of write operation, and the deterioration register B serves to store the number of ATIP errors and occurrence state at the time of read operation. Moreover, the deterioration register C serves to store the number of errors and occurrence state in C1 processing which will be described later, and the deterioration register D serves to store the number of errors and occurrence state in C2 error processing. It is to be noted that the deterioration register may be defined in, e.g., work memory used as FIFO 27, or may be defined in work memory included within the CPU 25.

From step S7, write operation onto the disc 60 is started. At the subsequent step S8, the number of errors of ATIP information is detected to generate first deterioration information to store the first deterioration information thus generated into the deterioration register A. When grooves are deteriorated by repetitive recording, etc. so that a predetermined number of uncorrectable address or more are continued, it becomes impossible to perform precise read operation of ATIP address. In view of the above, when unrestorable (unrecovable) error is found out by CRC error detection/correction processing of ATIP data which has been demodulated from wobble where address information is recorded, processing proceeds to step S20 subsequent to B of FIG. 3 in accordance with discrimination of step S9. At this step, second deterioration information (warning display) to the effect that "Disc error has taken place. Please perform exchange into new disc to conduct photographic operation again", etc. is displayed to complete processing. In this practical example, the first deterioration information is mainly error index within the digital camera 1, and the second deterioration information is warning information for allowing the digital camera 1 to notify error to the external (user).

At step S9, even in the case where uncorrectable address read error does not exist, error which is considered to be deterioration of the recording medium is detected to generate information of occurrence state as to whether or not read error of address of ATIP stored in the deterioration register A as the first deterioration information at the step S8 is detected over successive two frames or more, or whether or not four read errors or more are detected on the average at 75 frames. In the case where error detecting state is adapted to such condition, processing proceeds to step S18. The processing proceeds to step S19 in accordance with the judgment at this step to perform warning display.

In the case where uncorrectable address read error of ATIP does not exist at the step S9, read-out operation for verify processing is performed at the subsequent step S10. Processing at subsequent steps S11 and S12 respectively correspond to the above-described steps S8 and S9. Namely, similarly, at the step S11, information of occurrence state as to whether or not address read error of ATIP is detected over successive two frames or more, or whether or not four errors or more are detected on the average at 75 frames is generated as first deterioration information to store the first deterioration information thus generated into the deterioration register B. In the case where error detecting state is adapted to the condition as described above, processing proceeds to the step S18 of the subsequent stage. Processing proceeds to step S19 in accordance with the judgment at this step to perform warning display.

In the case where uncorrectable address read error detected from return light does not exist at the discrimination step of the step S12, decode processing of data which has been read out is performed at the subsequent step S13. At subsequent steps, error detection/correction operations are executed in order of C1 processing and C2 processing using CIRC, and mode 1.

At step S14, the numbers of detected errors of C1, C2 are generated as first deterioration information to store those information into deterioration registers C, D. At step S18, these information are judged. At step S19, warning display is performed.

At step S15, whether or not uncorrectable error exists in data on the recording medium is discriminated. In the case where uncorrectable error has been detected at this step, processing proceeds to step S20. At this step, disc error display to the effect that "Disc error has taken place. Please perform exchange into new disc to conduct photographic operation again" is performed to complete processing.

Figure 3:
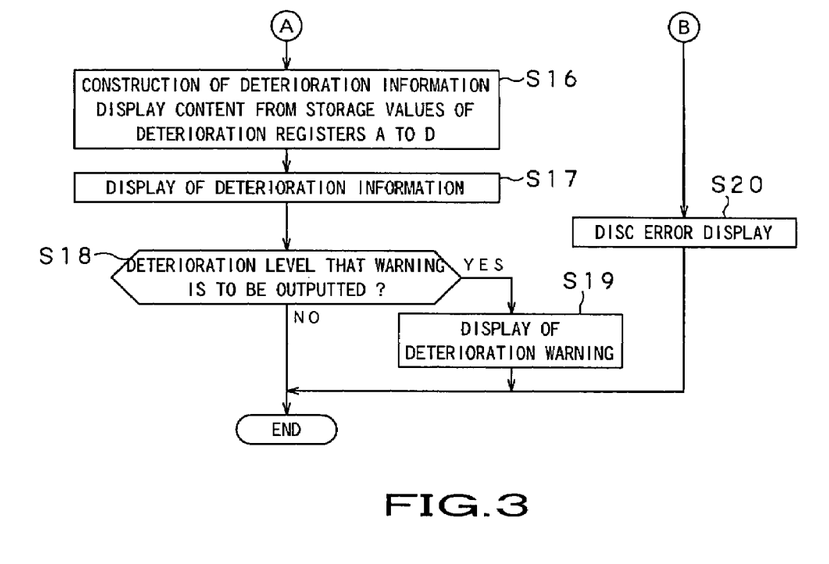
FIG. 3 is a flowchart showing error detection/correction processing procedure and medium deterioration judgment processing procedure in the digital camera according to the present invention.

Finally, at step S16 subsequent to A of FIG. 3, display content is visualized and reconstructed from information generated as first deterioration information and stored in the deterioration registers A to D to display the display content on the LCD 23 at step S17.

Further, at step S18, first deterioration information stored in the deterioration registers A to D is compared with a predetermined threshold value to perform warning display. In concrete terms, in the case where the contents of the deterioration registers A, B indicate that "ATIP address read error has been detected over two frames or more", or that "Four read errors or more have been detected on the average at 75 frames", disc warning display to the effect that "There is the possibility that disc may be deteriorated so that error takes place. Please use new disc from the next time", or the like is performed at step S19 to complete processing.

Similarly, in the case where the contents of the deterioration registers C, D indicate that "200 errors or more detected in C1 processing have been detected on the average with respect to successive 750 frames", or that "One error or more detected in C2 processing have been detected", disc warning display is similarly performed to complete processing.

Figure 5:
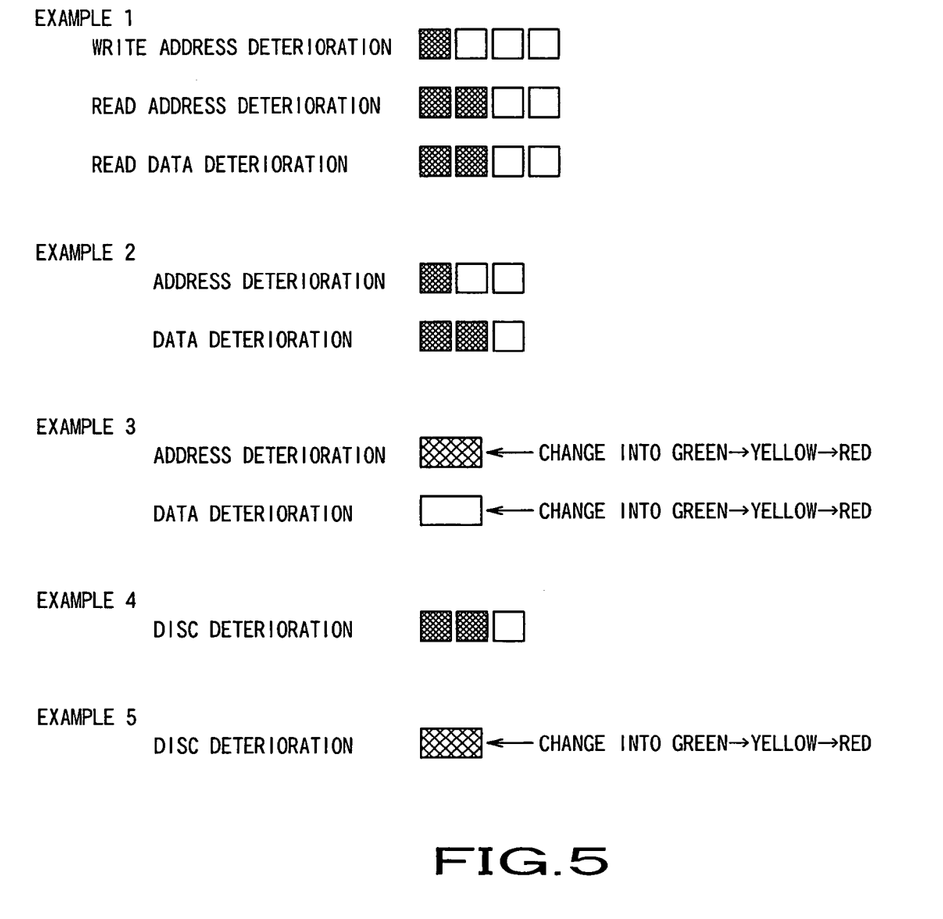
FIG. 5 is a view showing display example of deterioration information displayed on display unit of the digital camera according to the present invention.

As a method of display, as described above, only warning display to hasten exchange may be performed, or detailed deterioration information may be visualized and displayed. A display example of deterioration information is shown in FIG. 5. The example 1 is an example where write address deterioration, read address deterioration and read data deterioration are separately displayed. Four marks are provided with respect to respective deterioration items. Thus, degree of deterioration can be recognized in dependency upon the number of marks turned ON. The example 2 is an example where address deterioration and data deterioration are displayed. Similarly to the example 1, degree of deterioration is displayed in dependency upon the number of marks turned ON. The example 3 is an example where address deterioration and data deterioration are displayed in dependency upon color of lamp. There is employed a method in which degree of deterioration is developed in accordance with change of color, e.g., in order of green, yellow and red. In addition, only disc deterioration may be displayed by any one of the above-described methods as in the case of the examples 4 and 5.

As stated above, in the present invention, first deterioration information is generated from the number of errors (frequency) detected at respective predetermined error correction processing before uncorrectable error takes place to thereby have ability to display warning (second deterioration information) in accordance with the first deterioration information. For this reason, it is possible to hasten user to perform exchange of the recording medium.

For this reason, unlike the conventional technique to instruct exchange of the recording medium at the time point when serious error has taken place, not only loss of recording data can be avoided in advance, but also reliable data recording operation can be realized with respect to such digital cameras required to execute recording operation even under severe condition.

It is a matter of course that the present invention is not limited to the above-described examples, but various modifications or alternative constructions can be implemented without departing from the scope and spirit of the present invention. For example, if microphone and speech processing circuit, etc. are provided, the above-described digital camera can also record audio data along with image data.

INDUSTRIAL APPLICABILITY

As described above, in accordance with the data recording/reproducing device according to the present invention, error frequency of recording medium which becomes clear in the process up to error detection/correction is generated as first deterioration information to store the first deterioration information thus generated to compare it with a predetermined threshold value to allow the information obtained as the result of comparison to be deterioration information for evaluating degree of deterioration to have ability to display information indicating degree of deterioration on display means. Thus, unlike the conventional technique where exchange of recording medium is instructed at the time point when serious error has taken place, not only loss of recording data can be avoided in advance, but also reliable data recording operation can be realized with respect to the requirement where recording operation is executed even under severe condition.

Moreover, in accordance with the data recording/reproducing method according to the present invention, error frequency of recording medium which becomes clear in the process up to error detection/correction is generated as first deterioration information to store the first deterioration information thus generated to compare it with a predetermined threshold value to allow the information obtained as the result of comparison to be deterioration information for evaluating degree of deterioration to display information indicating degree of deterioration. Thus, unlike the conventional technique where exchange of recording medium is instructed at the time point when serious error has taken place, not only loss of recording data can be avoided in advance, but also reliable data recording operation can be realized with respect to the requirement where recording operation is executed even under severe condition.

Furthermore, in accordance with the digital camera according to the present invention, there is generated, as first deterioration information, error frequency of recording medium which becomes clear in the process up to error detection/correction in recording picked-up image data to store the first deterioration information thus generated to compare it with a predetermined threshold value to allow the information obtained as the result of comparison to be deterioration information for evaluating degree of deterioration to display information indicating degree of deterioration. Thus, unlike the conventional technique where exchange of recording medium is instructed at the time point when serious error has taken place, not only loss of recording data can be avoided, but also reliable data recording operation can be realized with respect to the requirement where recording operation is executed even under severe condition.

The invention claimed is:

1. A data recording/reproducing device adapted for recording and/or reproducing data by an optical recording system with respect to a disc-shaped recording medium, the data recording/reproducing device comprising:
   recording/reproducing means for recording and/or reproducing the data;
   deterioration information detecting means for detecting deterioration of the disc-shaped recording medium;
   display means for displaying deterioration information of the disc-shaped recording medium; and
   control means for performing a control to generate deterioration information indicating deterioration in accordance with the detected deterioration to conduct a display on the display means in accordance with the deterioration information,
   wherein the deterioration information detecting means detects read error frequency in reading out address information on the disc-shaped recording medium to generate first deterioration information from the read error frequency, and the control means generates second deterioration information when the first deterioration information is above a predetermined threshold value.

2. The data recording/reproducing device as set forth in claim 1,
   wherein address information on the disc-shaped recording medium is ATIP (Absolute Time In Pregroove).

3. A data recording/reproducing device adapted for recording and/or reproducing data by an optical recording system with respect to a disc-shaped recording medium, the data recording/reproducing device comprising:
   recording/reproducing means for recording and/or reproducing the data;
   deterioration information detecting means for detecting deterioration of the disc-shaped recording medium;
   display means for displaying deterioration information of the disc-shaped recording medium; and
   control means for performing a control to generate deterioration information indicating deterioration in accordance with the detected deterioration to conduct a display on the display means in accordance with the deterioration information,
   wherein the deterioration information detecting means detects error frequency of data to which a predetermined error correction encoding has been implemented and recorded on the disc-shaped recording medium to generate first deterioration information from error frequency of the recorded data, and the control means serves to generate second deterioration information when the first deterioration information is above a predetermined threshold value.

4. The data recording/reproducing device as set forth in claim 3, wherein the error correction encoding is performed by using CIRC (Cross-Interleaved Reed-Solomon Code).

5. A data recording/reproducing method of recording and/or reproducing data by an optical recording system with respect to a disc-shaped recording medium, the data recording/reproducing method comprising the steps of:

a deterioration detection step of detecting deterioration of the disc-shaped recording medium in recording and/or reproducing the data; and a control step of performing a control to generate deterioration information indicating deterioration in accordance with the detected deterioration to conduct a display on display means in accordance with the deterioration information, wherein, at the deterioration information detection step, read error frequency in reading out address information on the disc-shaped recording medium is detected so that first deterioration information is generated from the read error frequency, and at the control step, second deterioration information is generated when the first deterioration information is above a predetermined threshold value.

6. The data recording/reproducing method as set forth in claim 5, wherein address information on the disc-shaped recording medium is ATIP (Absolute Time In Pregroove).

7. A data recording/reproducing method of recording and/or reproducing data by an optical recording system with respect to a disc-shaped recording medium, the data recording/reproducing method comprising the steps of:

a deterioration detection step of detecting deterioration of the disc-shaped recording medium in recording and/or reproducing the data; and a control step of performing a control to generate deterioration information indicating deterioration in accordance with the detected deterioration to conduct a display on display means in accordance with the deterioration information, wherein, at the deterioration information detection step, error frequency of data to which a predetermined error correction encoding has been implemented and recorded on the disc-shaped recording medium is detected, and, at the control step, first deterioration information is generated from error frequency of the recorded data, and second deterioration information is generated when the first deterioration information is above a predetermined value.

8. The data recording/reproducing method as set forth in claim 7, wherein the error correction encoding is performed by using CIRC (Cross-Interleaved Reed-Solomon Code).

9. A digital camera adapted for recording and/or reproducing data by the optical recording system with respect to a disc-shaped recording medium, the digital camera comprising:

image pick-up means for picking up an image of an object;

image processing means for processing image data which has been picked up by the image pick-up means;

recording/reproducing means for recording and/or reproducing the image data with respect to the disc-shaped recording medium;

deterioration information detecting means for detecting deterioration of the disc-shaped recording medium;

display means for displaying deterioration information of the disc-shaped recording medium, and control means for performing a control to generate deterioration information indicating deterioration in accordance with the detected deterioration to conduct a display on the display means in accordance with the deterioration information.

10. The digital camera as set forth in claim 9, wherein the deterioration information detecting means detects read error frequency in reading out address information on the disc-shaped recording medium to generate first deterioration information from the read error, and the control means generates second deterioration information when the first deterioration information is above a predetermined threshold value.

11. The digital camera as set forth in claim 10, wherein address information on the disc-shaped recording medium is ATIP (Absolute Time In Pregroove).

12. The digital camera as set forth in claim 9, wherein the deterioration information detecting means detects error frequency of data to which a predetermined error correction encoding has been implemented and recorded on the disc-shaped recording medium to generate first deterioration information from error frequency of the recorded data, and the control means generates second deterioration information when the first deterioration information is above a predetermined threshold value.

13. The digital camera as set forth in claim 12, wherein the error correction encoding is performed by using CRC (Cross-Interleaved Reed-Solomon Code).

* * * * *